United States Patent [19]

Duxbury

[11] Patent Number: 4,760,547

[45] Date of Patent: Jul. 26, 1988

[54] REMOTE CONTROLLED MULTI-STATION IRRIGATION SYSTEM WITH DTMF TRANSMITTER

[76] Inventor: Jonathan W. Duxbury, 3673 Citronella, Simi Valley, Calif. 93063

[21] Appl. No.: 779,659

[22] Filed: Sep. 24, 1985

[51] Int. Cl.⁴ .............................................. G05D 7/06
[52] U.S. Cl. ....................................... 364/420; 455/95; 239/69; 364/146; 364/510
[58] Field of Search ............... 364/146, 400, 420, 510; 137/15; 239/68, 70, 69; 455/95-100

[56] References Cited

U.S. PATENT DOCUMENTS

| | | | |
|---|---|---|---|
| Re. 31,023 | 9/1982 | Hall, III | 364/400 X |
| 3,726,477 | 4/1973 | Shapiro | 239/70 |
| 4,008,776 | 2/1977 | Kushmuk | 177/241 |
| 4,015,366 | 4/1977 | Hall, III | 364/400 X |
| 4,162,449 | 7/1979 | Bouyssounouse | 455/100 |
| 4,185,650 | 1/1980 | Neves et al. | 135/15 |
| 4,203,109 | 5/1980 | Ballard et al. | 455/99 |
| 4,209,131 | 6/1980 | Barash et al. | 239/68 |
| 4,236,594 | 12/1980 | Ramsperger | 364/424 |
| 4,244,022 | 1/1981 | Kendall | 364/420 |
| 4,385,206 | 5/1983 | Bradshaw et al. | 379/284 |
| 4,423,484 | 12/1983 | Hamilton | 364/420 |
| 4,471,493 | 9/1984 | Schober | 455/97 |
| 4,567,563 | 1/1986 | Hirsch | 364/400 |
| 4,569,020 | 2/1986 | Snoddy et al. | 364/420 |
| 4,626,984 | 12/1986 | Unruh et al. | 364/420 |
| 4,646,224 | 2/1987 | Ransburg et al. | 364/420 |
| 4,675,898 | 7/1987 | Bellenger | 379/97 |

Primary Examiner—Jerry Smith
Assistant Examiner—Allen MacDonald
Attorney, Agent, or Firm—Koppel & Jacobs

[57] ABSTRACT

A remote controlled multi-station irrigation system in which discrete radio signals are transmitted from a remote location for each different function to be performed. The system includes a controller with a central processor, individual station actuator circuits, and interface circuitry; a transmitter which preferably transmits in an FM dual tone multi-frequency format, and a receiver which decodes the transmitted signal to hexadecimal data. The controller is automatically converted from a local to a remote operating mode by the insertion of a connecting cable from the receiver. The controller can be operated in real time or programmed for future operation from a remote location. The receiver can also be adapted for conventional controllers by adding field actuator circuitry which is connected directly to the field wires, bypassing the controller during remote operation.

20 Claims, No Drawings

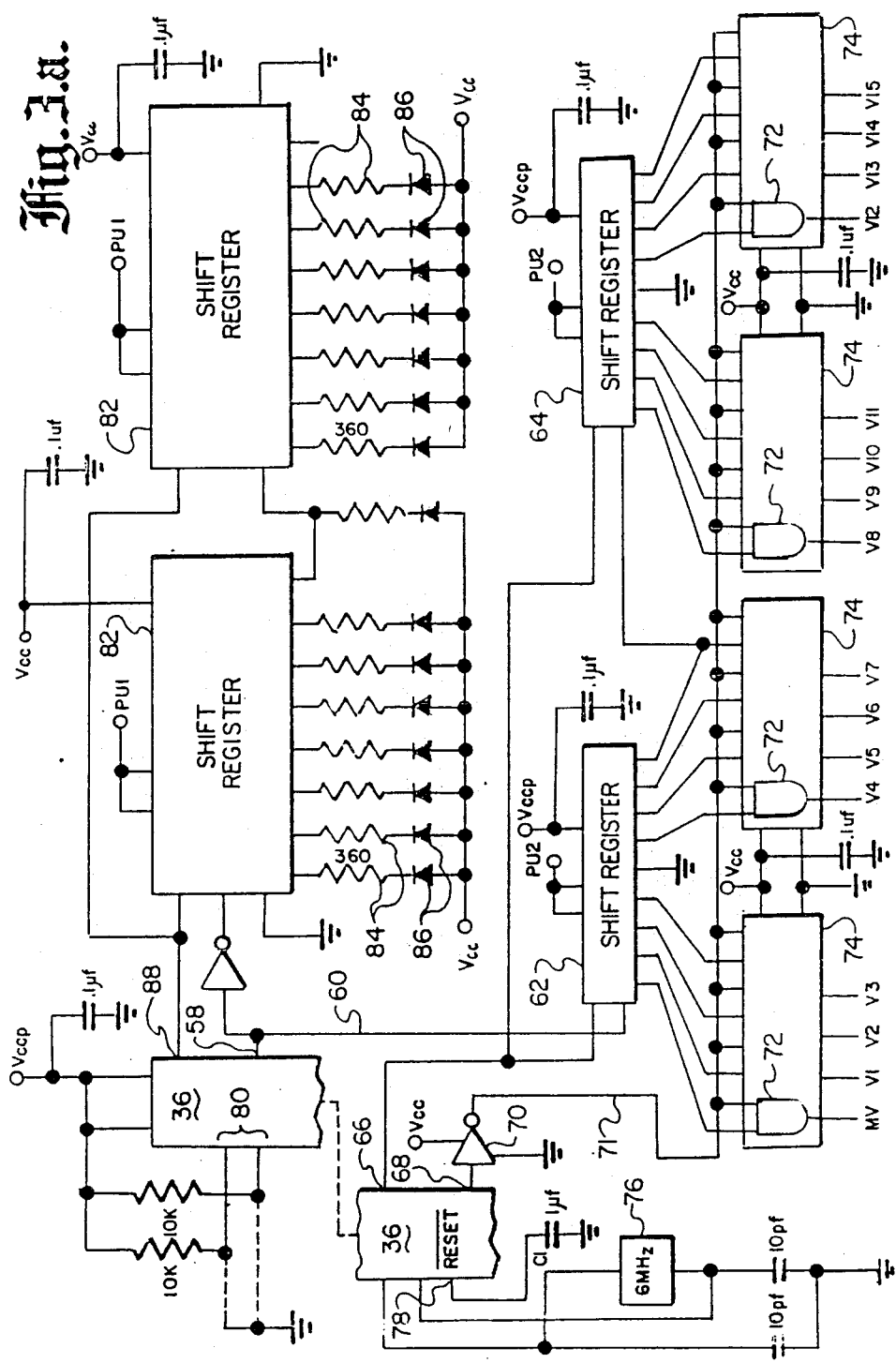

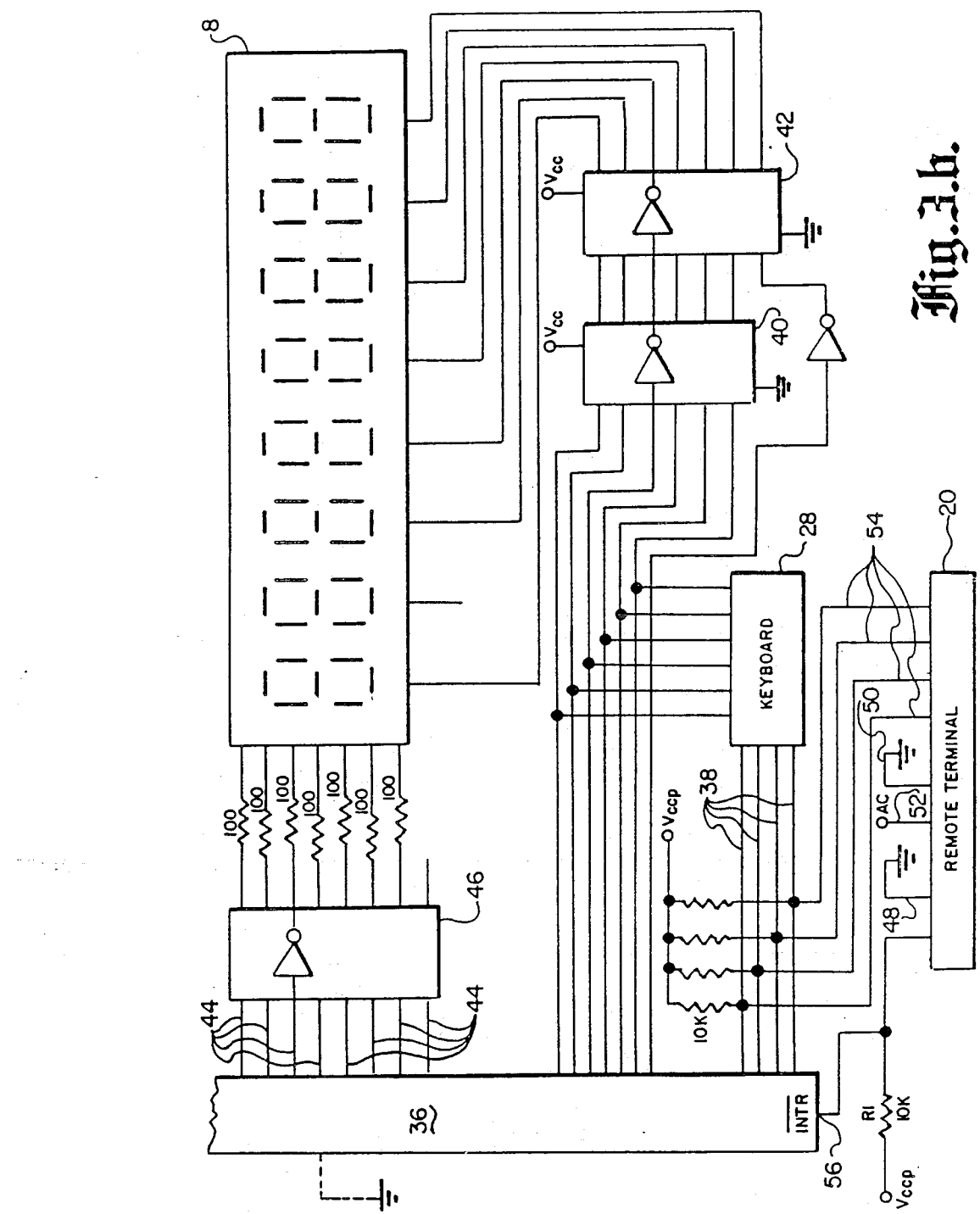

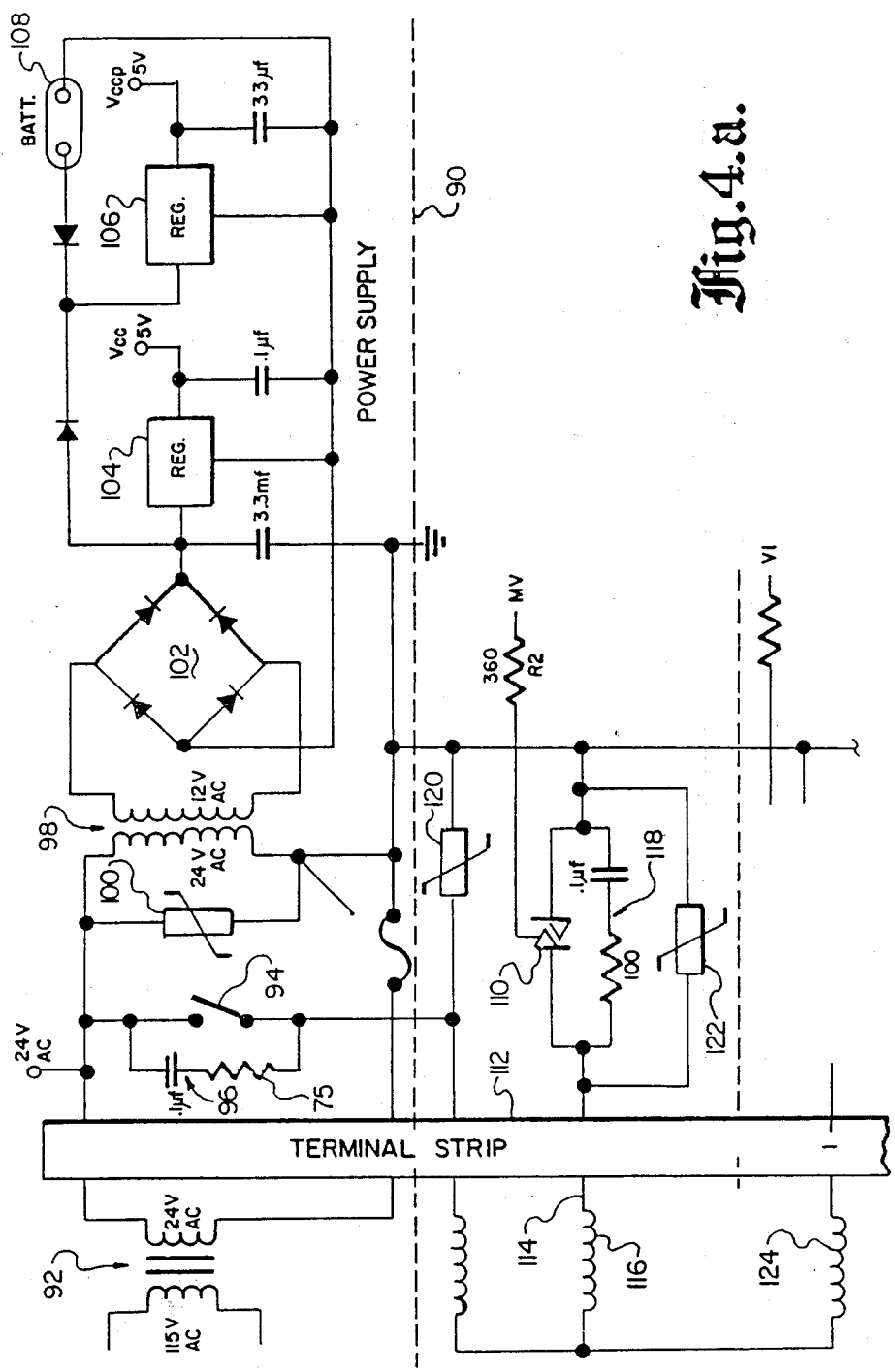
Fig. 4.a.

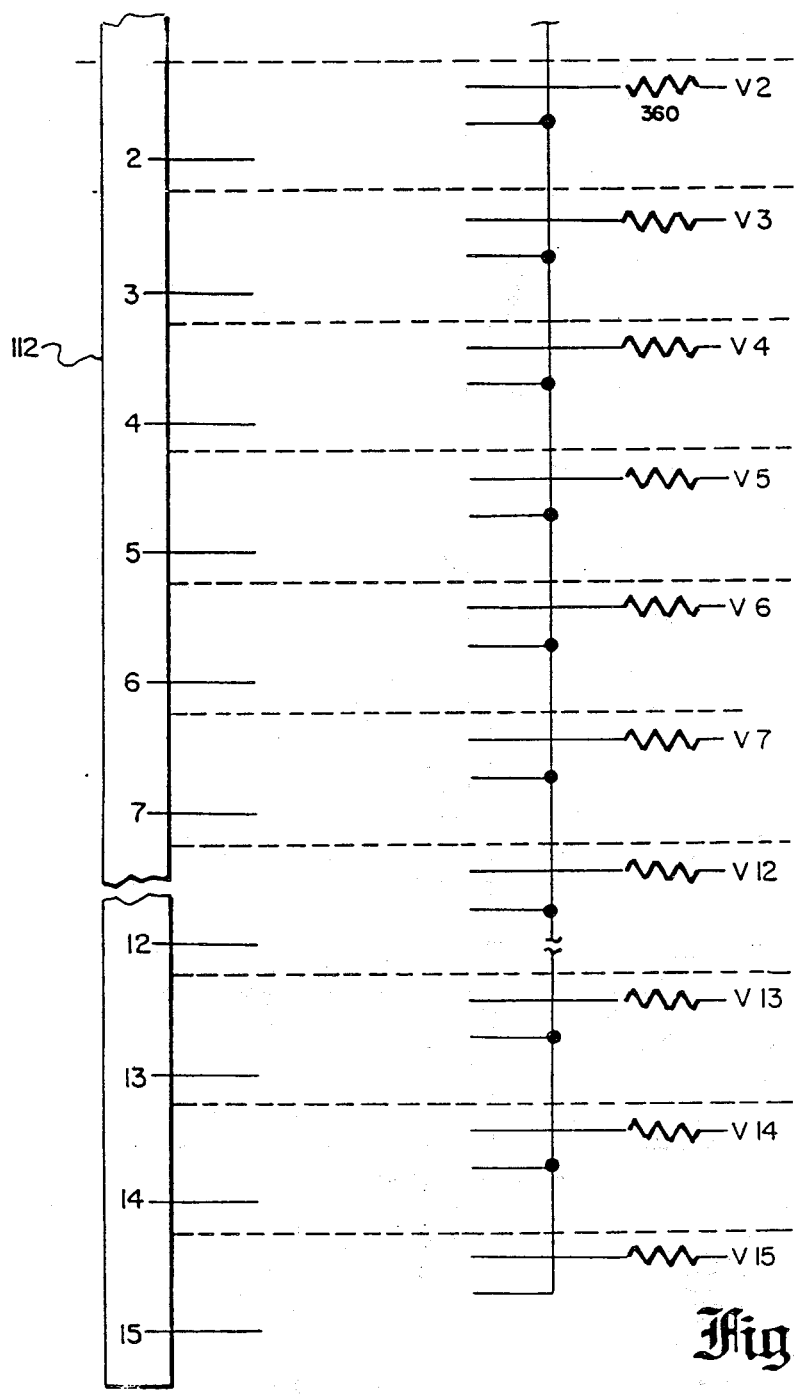
Fig.4.b.

4,760,547

REMOTE CONTROLLED MULTI-STATION IRRIGATION SYSTEM WITH DTMF TRANSMITTER

BACKGROUND OF THE INVENTION

1. Field of the Invention

This invention relates to irrigation control systems, and more particularly to a system in which a multi-station controller can be operated from a remote location.

2. Description of the Prior Art

There are many large irrigation systems which employ a large number of widely separated valves to irrigate an extended area. Examples of such installations include farms, golf courses and large real estate development projects, in which a large number of stations may be employed. These systems generally employ a master controller which communicates with the various station valve by means of wire or radio. The controller can typically be programmed to operate each of the valves at desired intervals and for desired periods of time.

One of the principal problems in servicing such systems is that the maintenance person must do a lot of walking back and forth between the various stations and the central controller to turn one station at a time on and off for observation and servicing. In large systems the great majority of service time is often spent just walking (or driving if a suitable vehicle is available), rather than actually servicing the irrigation hardware. This waste of time is both costly and inefficient.

In an attempt to reduce the servicing time wasted in travelling back and forth between the controller and valves, a remote control device has been developed which permits the service person to exercise the controller and turn the valves on and off from a remote location, generally at or near a valve. The system is disclosed in U.S. Pat. No. 4,185,650 to Neves et al. Initially, the central controller is programmed to cycle through a predetermined sequence of stations for normal operation. Thus, each station is turned on and off in turn in the predetermined sequence, until the entire area has been watered. The service person is provided with a radio transmitter, which communicates with a corresponding receiver at the central controller. The transmitter can transmit on two different frequencies, one for advancing the controller through its station cycle to the desired station, and the other for turning the station on and off. To exercise any particular valve, the service person must first transmit at the station cycling frequency to advance the controller through its cycle, one station at a time. When the desired station has been reached, he then switches to the second frequency to turn it on.

While the system disclosed in the Neves patent is an improvement over the prior technique of physically travelling back and forth between the master controller and the various stations, its mode of operation is limited and can be somewhat inefficient. For example, if the central controller is set to the tenth station in a thirty-six station irrigation system and it is desired to operate the ninth station, the controller must be cycled up from the tenth station and all the way through the thirty-four intervening stations until it reaches the desired ninth station. This can be a time-consuming procedure which mitigates some of the advantage that could otherwise be obtained with the system.

SUMMARY OF THE INVENTION

In view of the above problems associated with the prior art, the object of the present invention is the provision of a novel and improved remote controlled multi-station irrigation system which provides for greater flexibility and responsivity to commands transmitted from a remote location, which has a reliable means of communication with the remote location, and which provides for both local and remote programming of the irrigation controller.

The principal components of the novel system include a controller capable of governing a plurality of irrigation stations, a remote transmitter, a receiver which is adapted to receive signals from the transmitter and to produce corresponding input control signals for the controller, and a connecting means which delivers input signals from the receiver to the controller. The controller includes a plurality of individual station actuator circuits, a central processor, an input terminal which is connected to provide input signals to the central processor, and interface circuitry between the processor and the station actuator circuits. The processor is responsive to input signals delivered from the receiver and input terminal to provide actuation signals to selected station actuator circuits via the interface circuitry. The remote transmitter is adapted to transmit discrete signals corresponding to respective station actuator circuits, and includes means for selecting a particular signal for transmission. In this way any station can be immediately selected to be turned on or off, without having to cycle through the entire set of stations.

In a preferred embodiment the receiver is removably mountable on the controller, and is supplied with power from the controller by a power interconnect means. The transmitter includes a keyboard and is adapted to transmit discrete radio signals in response to discrete keys being pushed. The transmitted signals are in an FM dual tone multi-frequency format, and are decoded by the receiver to a hexadecimal format for application to the controller. The controller can be operated in either a local or a remote mode, and includes a local keyboard which is connected to supply irrigation program information to the processor. In the local mode the station actuator circuits are operated in response to program information stored in the processor. Inserting a connector from the receiver into the controller input terminal interrupts the local mode and sets the controller to its remote mode, in which the processor is responsive to input signals from the receiver. The receiver connecting means comprises a removable plug which can be inserted into the controller's input terminal. The input terminal has a common connection with the controller's local keyboard to the processor, enabling the processor to be programmed with input signals from the receiver when in the remote mode.

In addition to the system's ability to immediately actuate any desired station from the remote mode, the processor includes means for remotely advancing the application of an actuating signal among the station actuator circuits. For this purpose the transmitter is adapted to transmit a discrete radio signal which causes the receiver to produce a corresponding processor input signal to activate the station actuator advancing means. Thus, the remote operator has the option of either selecting individual stations to operate, or of cycling the system through its various stations in sequence. When the transmitter and receiver are used in conjunction with a conventional controller which does not have the station actuator circuitry contemplated by the invention, this circuitry can be added to the receiver and the controller bypassed during remote operation. The transmitter is also adapted to save power by automatically disconnecting most of the circuitry from a power supply except when it is transmitting a control signal.

These and other objects of the invention will be apparent to those skilled in the art from the following detailed description of a preferred embodiment, taken together with the accompanying drawings, in which:

DESCRIPTION OF THE DRAWINGS

FIGS. 3a and 3b are schematic diagrams of the controller circuitry associated with its central processor;

FIGS. 4a and 4b are schematic diagrams of the controller circuitry associated with the station actuator circuits;

DETAILED DESCRIPTION OF A PREFERRED EMBODIMENT

Figure 1:
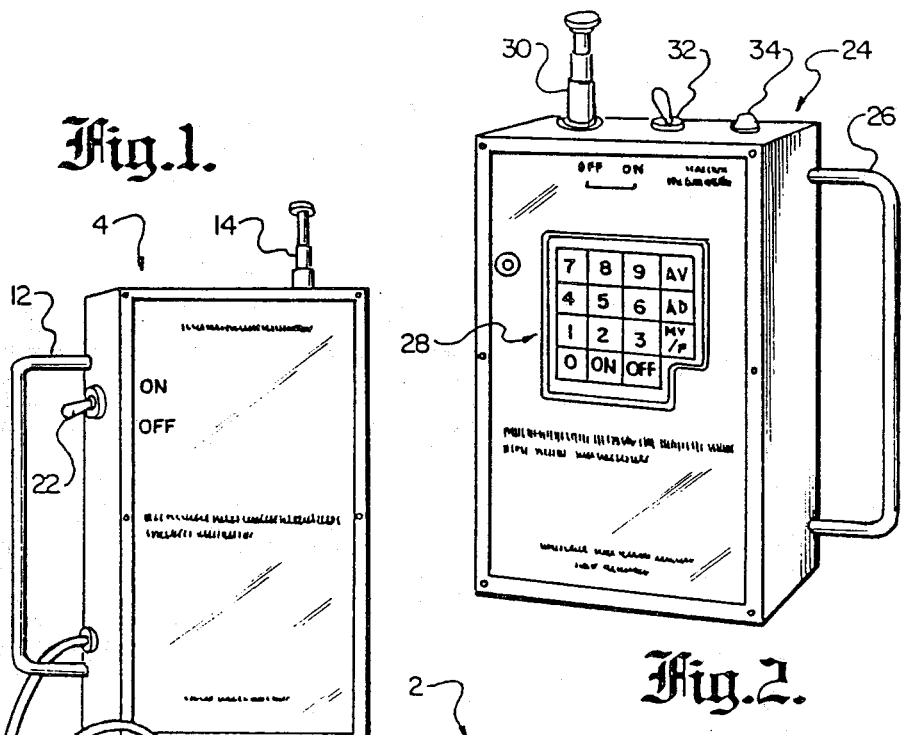
FIG. 1 is a perspective view of the irrigation controller with a remote signal receiver mounted on top.

FIG. 1 shows the exteriors of an irrigation controller 2 and of a receiver 4 which is adapted to decode remotely transmitted control signals and apply them to the controller in accordance with the invention. The controller includes a keyboard 6 with an array of keys for inputting local program information into the controller's processor, such as time, sequence of station operation, duration of irrigation for each station, irrigation cycles, station identification, etc. Controllers can be supplied with various station capacities; 12, 18, 24, 30 or 36 stations per controller are typical. A first LED display 8 provides a visual indication of the program information being applied, while a second LED display 10 has one light for each station, arrayed in a line. When any particular station is activated its corresponding light in display 10 goes on, providing a visual indication of the status of the irrigation system.

Receiver 4 has a carrying handle 12 for ease of portability, and can be mounted on top of the controller as shown. Clips, screws or the like can be provided to hold the receiver in place on the controller. An antenna 14 receives a remote control signal, typically sent by a field service person at a distant irrigation station, and decodes the received radio signal into a signal format that is recognizable by the controller's processor. This signal is delivered to the controller over a connecting cable 16. A plug 18 is connected to the end of cable 16 and is inserted into a corresponding controller terminal receptable 20, which in turn is connected to the processor. Cable 16 also provides a conduit for supplying electrical power from the controller 2 to the receiver 4. An on/off switch 22 is provided on the receiver.

Figure 2:
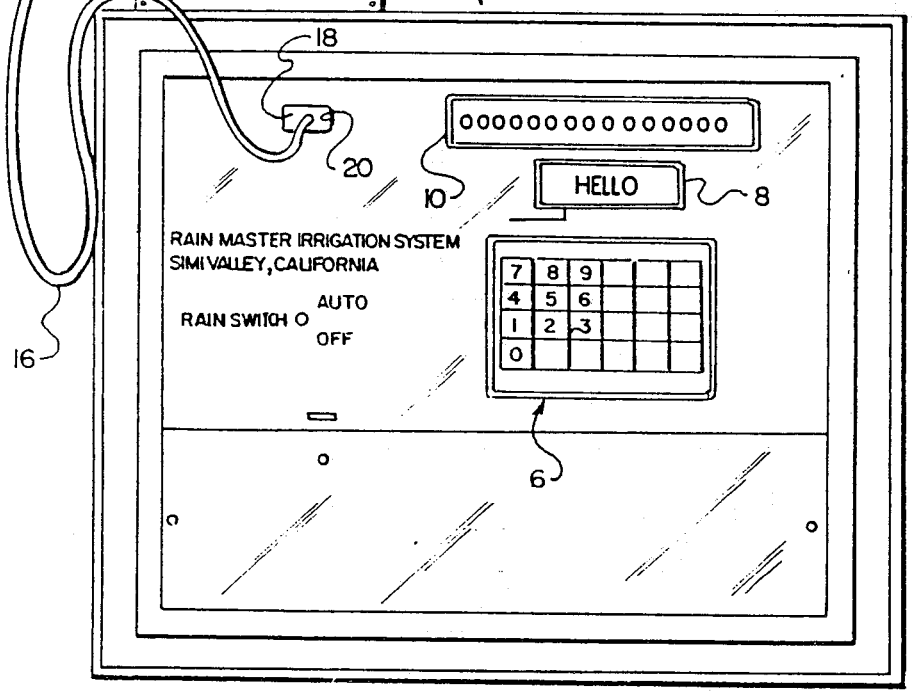
FIG. 2 is a perspective view of the transmitter.

The remote transmitter 24 used with this system is shown in FIG. 2. It has a carrying handle 26 which mates with the receiver handle 12, permitting the receiver and transmitter to be carried as a unit when not in use. A keyboard 28 on the front of the transmitter has numerical keys which permit any station to be identified, ON and OFF keys for transmitting a signal to turn a designated station on or off, AUTO UP (AU) and AUTO DOWN (AD) keys which cause the controller to cycle from one station to the next, and a MASTER VALVE/PUMP (MV/P) key which permits the master valve/pump to be turned on or off. The transmitter also includes an antenna 30, an on/off switch 32, and a battery jack for recharging the battery.

Transmitter 24 has a range of approximately one mile. To turn any irrigation station on, the number of that station is simply keyed in, followed by pressing the ON key. The station can then be turned off by pressing the OFF key. If it is desired to turn the same station on again, this is accomplished by simply pressing the ON key, without having to press the station's number again. When a new station is desired, the new station number is punched in and the ON key depressed. In some irrigation systems a master valve is provided to control the flow of water to all stations; the master valve must be on for any station to receive water. Although it is designated by a separate key, the master valve is operated in a manner similar to all of the other stations. To actuate the master valve, the MV/P and ON keys are depressed.

Another feature of the system is the provision of AUTO UP and AUTO DOWN keys. If it is desired to exercise the stations in sequence, a first station is initially turned on. Alternately, the AUTO UP or DOWN sequence can be started with station number one by initially pressing AUTO UP or DOWN. Thereafter the processor is programmed to respond to pressing AUTO UP by turning off the current station without entering any station numbers or depressing the ON or OFF keys. Station cycling in the opposite direction is achieved by means of the AUTO DOWN key.

Referring now to FIGS. 3a and 3b, a schematic diagram of a microprocessor located inside the controller is shown. Depending upon the number of stations and the amount of program information to be stored, the Intel 8049 or 8050 microprocessors are suitable; the 8050 has twice the memory capacity of the 8049. The microprocessor, designated by reference numeral 36, is shown as being split into separate parts in FIGS. 3a and 3b, but of course is an integral unit. Referring first to FIG. 3b, the keyboard 28 is shown with four output lines 38 providing an input to the microprocessor or keying in local program information. The program information is also delivered to display 8 to show the information going to the microprocessor. The circuitry between keyboard 28 and display 8 includes an inverter circuit 40 and an inverter/driver circuit 42. The output of inverter/driver 42 determines which of the eight digits of display 8 are to be actuated. The selection of numerals for the actuated digits is provided from the microprocessor over lines 44 and through an inverting buffer/driver chip 46 which boosts the signals from the microprocessor. The display system is generally conventional, and is capable of displaying the system status under both local and remote control.

The input terminal 20 for the remote control signals is connected to two different ground references. One ground connection 48 serves as a reference for control signals from the receiver. The other ground connection 50 provides a reference for the 24 volts AC controller power supply. This AC voltage is delivered over line 52 to the receiver via cable 16.

Input signals from the receiver are transmitted to the microprocessor via lines 54, which are connected in common with respective input lines 38 from the keyboard to the same microprocessor ports. The microprocessor has two different modes of operation: a local mode for receiving information from the keyboard, and a remote mode for receiving information from the remote terminal. It is programmed to interpret the data from the two sources in different ways so that both remote and local control functions can be accomplished from the same input ports. For this purpose the microprocessor has an interrupt port 56 which is actuated by the cable plug 18 being inserted into the controller's remote terminal 20. In the local mode an internal microprocessor voltage $V_{CCP}$, which is regulated at a 5 volt DC level, is applied to interrupt port 56. This voltage signal is dissipated through resistor R1 when the remote plug is inserted into terminal 20, completing a circuit for $V_{CCP}$. This effectively removes the signal from port 56 and interrupts the local mode, setting the microprocessor into its remote mode. The microprocessor can now be supplied with program information from the remote transmitter, or it can operate the irrigation valves in response to remote inputs.

Interface circuitry is shown in FIG. 3a which interconnects the microprocessor with the various station actuator circuits (shown in FIGS. 4a and 4b). Microprocessor output data designating a particular station to be turned on is furnished from port 58 over line 60 to an eight bit shift register 62. Another eight bit shift register 64 is provided for serial storage of data with register 62, the two registers functioning in effect like a single sixteen bit register. Another signal from microprocessor port 66 clocks the data from pin 58 into the data shift registers 62 and 64. These registers hold the data identifying the station to be turned on until the data has stabilized. Upon receiving the initial clock signal from microprocessor port 66, the signals held in the various register ports ripple and require a finite amount of time to stabilize. Once a predetermined period of time has expired and the data in registers 62 and 64 has stabilized, the microprocessor produces a low output at port 68. This signal is fed through an inverter 70 and then along line 71 to provide an ENABLE signal for the various station actuator circuits.

Each shift register 62 and 64 has eight outputs, each of the outputs corresponding to a particular station (fifteen irrigation stations and one master valve/pump). Each output from the shift registers 62, 64 is delivered as one input to a respective AND gate 72, the various AND gates being grouped in banks of four with each bank 74 acting as a buffer/driver. The output of each AND gate 72 provides an actuating signal for a respective station actuator circuit. For example, the leftmost bank 74 includes four AND gates, the outputs of which are connected to the actuator circuits for the master valve and station valves V1-V3, while the outputs of the four AND gates in the right-hand bank are connected to the actuator circuits for station valves V12-V15, respectively. Thus, the microprocessor under remote control delivers a station identifying signal to line 60 for the particular station or stations to be actuated, and a corresponding signal is produced at the output of the appropriate AND gate 72 once the data in shift registers 62, 64 has stabilized sufficiently and an ENABLE signal is received from the microprocessor over line 71.

A conventional microprocessor clock is provided by a 6MHz oscillator 76. The microprocessor is held on when a POWER UP command is given by means of a capacitor C1 which is connected to an inverted RESET port 78; capacitor C1 charges in response to a POWER UP command to turn the microprocessor on and hold it on.

Microprocessor ports 80 are connected to adjustable circuitry which sets the controller for either five, seven, eleven or fifteen stations (excluding the master valve). This feature is important in connection with the AUTO UP and AUTO DOWN control capabilities associated with the remote transmitter. Upon receiving an AUTO UP signal, the microprocessor turns off the currently active station and turns on the next station by an appropriate change in the signal at port 66. If the microprocessor is set for seven stations, for example, it will return to station 1 when AUTO UP is received during operation of station 7. Conversely, if AUTO DOWN is received during operation of station 1, the microprocessor will shift to the uppermost station for which it is set.

The controller display 10 which indicates the station that is currently active is controlled by circuitry which includes a pair of eight bit shift registers 82. The individual shift register outputs are connected through respective current limiting resistors 84 to LEDs 86 which provide pinpoint light sources for the display. A clock signal for the display shift registers is provided from microprocessor port 88. In addition to lighting when a station is operating in the remote mode, LEDs 86 also indicate which stations are being programmed during the initial local programming sequence.

Referring now to FIG. 4a, the power supply for the controller and part of the station actuator circuitry is shown. The power supply, which is conventional, comprises the circuitry above dashed line 90. A standard 115 volt AC power input is stepped down to a 24 volt AC level suitable for the controller by transformer 92. The output of transformer 92 is connected to be shunted by a rain switch 94 operated from the front panel of the controller. The rain switch is paralleled by an RC arc suppression circuit 96. A second transformer 98 steps the 24 volts AC down to 12 volts AC, with a transient protector 100 connected across the transformer input to guard against AC spikes. A full-wave bridge rectifier 102 is connected to the transformer output and produces a 10 volt DC signal which is applied to voltage regulators 104 and 106, yielding regulated 5 volt DC voltages $V_{CC}$ and $V_{CCP}$, respectively. Regulator 106 has a nominally 9 volt backup supply battery 108 which assures that $V_{CCP}$ is retained when AC power is lost. $V_{CCP}$ provides DC power to the microprocessor and to shift registers 62 and 64, while DC power is provided to the remainder of the controller circuitry from $V_{CC}$.

In the illustrated controller with sixteen stations, sixteen identical actuator circuits are provided. Details of the first actuator circuit, for the master valve (MV), are shown in FIG. 4a. When an MV actuating signal is produced by the corresponding AND gate 72 in the controller interface circuitry, the signal is applied through a resistor R2 to the gate of a triac switch 110. The triac switch is connected to a terminal strip 112 and thereby to a lengthy lead line 114 to the master valve actuating coil 116. Gating the triac 110 in response to an MV actuating signal completes a circuit for MV coil 116 and causes the master valve to open. An RC snubber network 118 is provided in parallel to triac 110 to ensure that the triac turns on and off properly. Transient lightening protectors 120 and 122 are preferably provided at appropriate locations in the circuitry.

An identical actuating circuit is provided for the first irrigation valve V1. In response to a V1 actuating signal, the actuating circuit (left blank in FIG. 4a) closes a circuit for the V1 coil 124, causing V1 to open. The actuating circuits for the remaining valves are indicated in FIG. 4b.

Turning now to the transmitter/receiver system which provides remote control over the controller, transmitter 24 nd receiver 4 comprise a general purpose frequency modulated pair capable of transmitting and receiving sixteen discrete signals encoded in a dual tone multi-frequency (DTMF) format. Fifteen of the signals are active as decoded by the receiver, while the receiver's sixteenth code is considered inactive and used to indicate no transmission. In the preferred embodiment, transmitter 24 is capable of transmitting sixteen discrete signals on a fundamental frequency of 154.57 or 154.60 MHz (as set by the factory). The transmitted signals are decoded by receiver 4 into a hexadecimal data format suitable for the controller. The transmitter keys and their associated DTMF frequencies are as follows:

| KEY | DTMF FREQUENCY |
|---|---|
| MV/P | 852/1633 |
| AUTO DOWN | 770/1633 |
| AUTO UP | 697/1633 |
| OFF | 941/1477 |
| ON | 941/1336 |
| 0 | 941/1209 |
| 1 | 852/1209 |
| 2 | 852/1336 |
| 3 | 852/1477 |
| 4 | 770/1209 |
| 5 | 770/1336 |
| 6 | 770/1477 |
| 7 | 697/1209 |
| 8 | 697/1336 |
| 9 | 697/1477 |
| NO KEY | 941/1633 |

Figure 5:
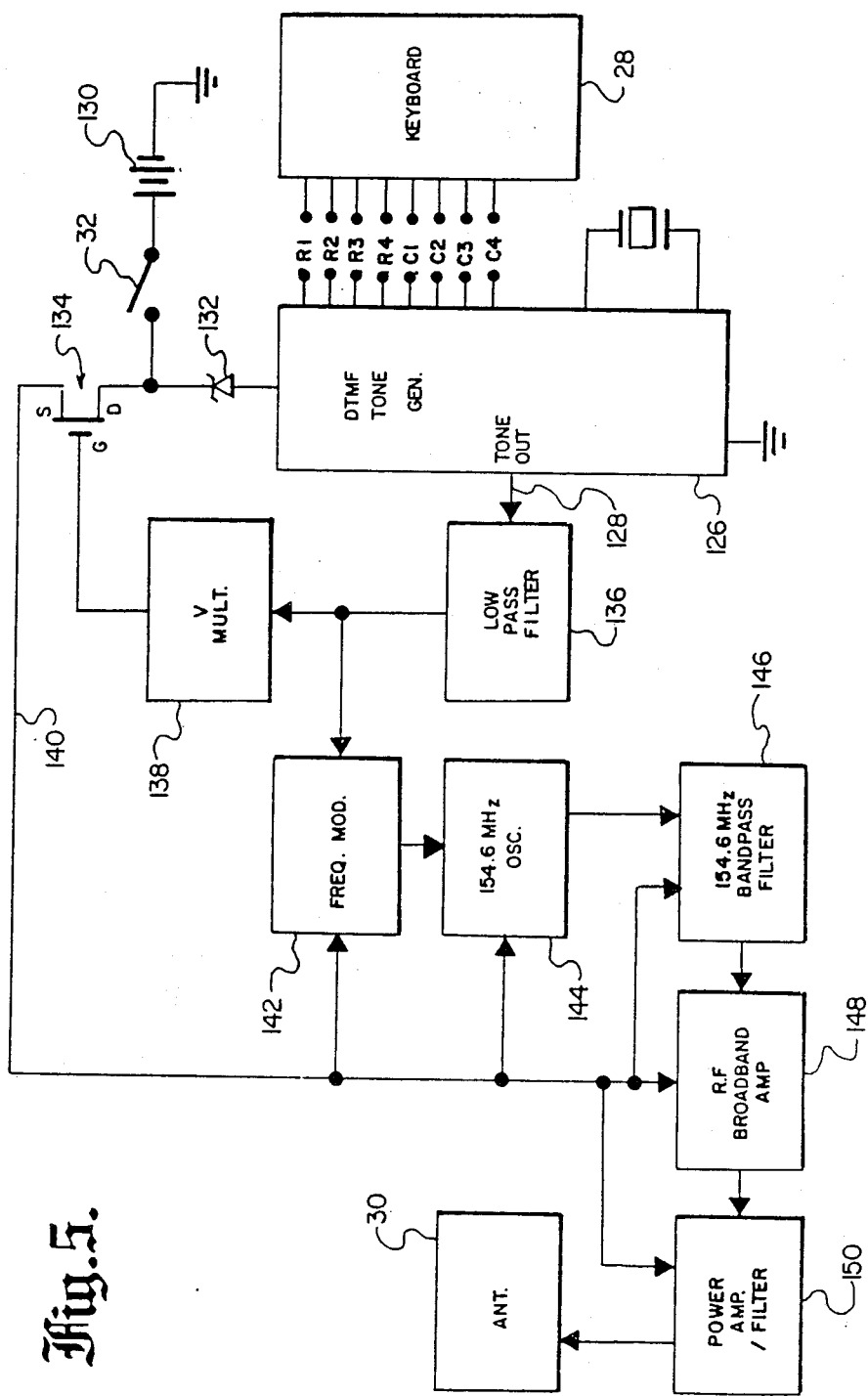
FIG. 5 is a block diagram of the transmitter circuitry.

A block diagram of the transmitter is shown in FIG. 5. The DTMF tones which control the individual station operations are generated by a tone generator chip 126, which preferably is a Mostek 5087 or similar device. The transmitter keyboard 28 is indexed by rows and columns, with each row and column providing an input to tone generator 126. The tone generator continuously strobes the keyboard to detect any keys that have been depressed. In response to operation of the keyboard, an output tone signal is produced on output line 128.

Tone generator 126 receives power from a nominally 12 volt battery 130 through the hand-operated switch 32 described previously, and a zener diode 132 which reduces the battery voltage to a level suitable for the tone generator. The battery is also connected to provide power to the remainder of the transmitter circuitry via and FET switch 134. To conserve the battery, switch 134 is normally open and is closed only in response to an output tone from tone generator 126. The tone generator output line 128 is connected through a low pass filter 136 to a voltage multiplier circuit 138, which steps up the voltage to a level sufficient to gate FET 134. Thus, the production of an output tone by tone generator 126 results in FET 134 being turned on, completing a power supply circuit over line 140 between the battery and the remainder of the transmitter circuitry.

The output of low pass filter 136 is also applied to a frequency modulator circuit 142, which modulates a 154.6 MHz carrier signal produced by oscillator 144 in accordance with the generated DTMF tone. The resultant modulated signal is processed through a 154.6 MHz band pass filter 146 and then amplified by a gain of approximately 23 dB in RF broadband amplifier 148. The signal is then brought up to a transmission power level by power amplifier/filter 150 and applied to the transmitter antenna 30.

Figure 6:
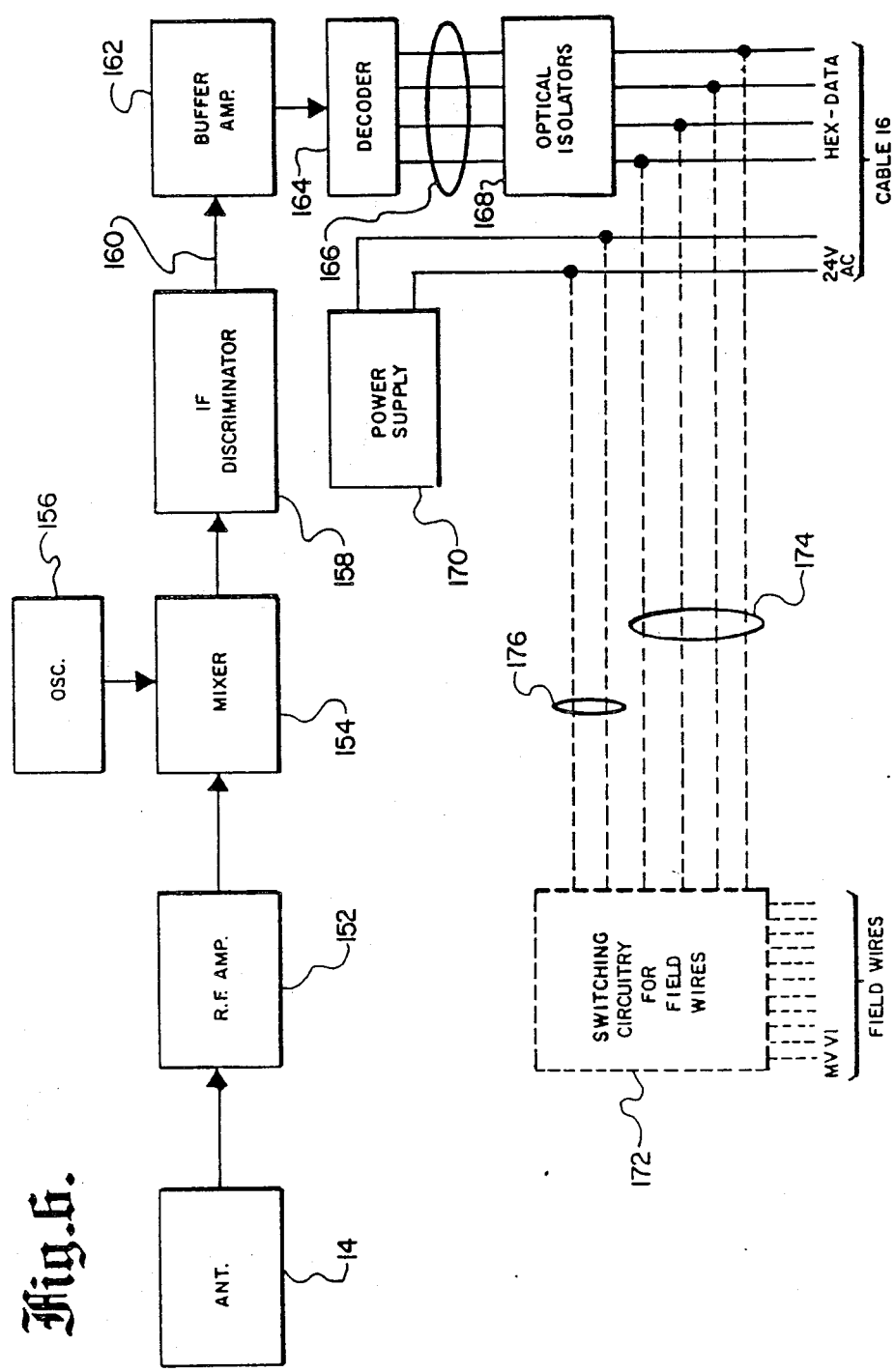
FIG. 6 is a block diagram of the receiver circuitry.

A block diagram of the circuitry employed by receiver 4 is shown in FIG. 6. A remotely transmitted signal is received by antenna 14, stepped up by RF amplifier 152 and applied to a mixer circuit 154, where it is mixed with a suitable signal from oscillator 156 to enable the 154.6 MHz carrier signal to be stripped off in a conventional manner. An IF discriminator circuit 158 strips off the carrier signal and produces an audio tone output over line 160. The latter signal is processed through a buffer amplifier circuit 162 and applied to a decoder circuit 164, which decodes the DTMF input signal to a hexadecimal output signal over four output lines 166. Decoder 164 can be implemented with a Silicon Systems, Inc. (SSI) model 202 chip. The decoder output is processed through an optical isolator circuit 168 which provides a secure ground, and then transmitted over cable 16 to the controller as discussed above. Cable 16 also includes a pair of power supply wires which bring a 24 volt AC signal to an internal receiver power supply 170, which in turn supplies power to the various receiver circuit elements (over connecting wires which are not shown in FIG. 6).

The various components of the system described thus far are designed to be compatible with each other. For example, the controller includes a microprocessor 36 which is programmed in its remote mode to respond to hexadecimal systems from the receiver. The system can also be adapted for use with conventional controllers which are not programmed in this manner. In this case actuation circuitry for the field wiring is provided in the receiver, and the controller is effectively bypassed during remote operation. This adaption is illustrated in dashed lines in FIG. 6, in which a set of switching circuitry 172 for the various field wires is provided in a manner similar to the valve actuator circuits shown in FIGS. 4a and 4b. Instead of being sent to the controller, the hexadecimal input signals from decoder 164 are delivered over lines 174 to the receiver switching circuitry 172. The switching circuitry has a separate output for each valve to be controlled, and responds to input signals from lines 174 to produce energizing signals for the identified valves. The switching circuitry is provided with power from power supply 170 over lines 176.

A remote controlled multi-station irrigation system has thus been shown and described which is much easier to operate and more convenient than previous systems, and can be adapted for use with either specially designed controllers or conventional controllers. As numerous variations and alternate embodiments will occur to those skilled in the art, it is intended that the invention be limited only in terms of the appended claims.

I claim:
1. A remote controlled multi-station irrigation system, comprising:
　a controller comprising:
　　(a) a plurality of individual station actuator circuits,
　　(b) a central processor,
　　(c) an input terminal means connected to provide input signals to the central processor, and

(d) interface circuitry interfacing between the central processor and the station actuator circuits, the processor being responsive to input signals from the input terminal means to provide operational control signals via the interface circuitry to selected actuator circuits, a remote portable transmitter adapted to broadcast selectable discrete wireless station identity signals corresponding to the respective station actuator circuits, together with an operation signal to initiate the actuation or deactuation of a selected station; the transmitter including means for manually selecting a particular station identification and operational signal for transmission, a receiver adapted to receive broadcast signals from the transmitter and to produce corresponding input signals for the central processor, the central processor responding to said input signals to provide an operational control signal corresponding to the received operational signal only to the actuator circuit for the selected station and means connecting the receiver with the controller's input terminal means for transmitting processor input signals from the receiver to the controller.

2. The remote controlled irrigationn system of claim 1, wherein the receiver is removably mountable on the controller.

3. The remote controlled multi-station irrigation system of claim 1, wherein the controller includes an electrical power supply, and a power interconnect means connected to supply electric power from the controller to the receiver.

4. The remote controlled irrigation system of claim 1, wherein the transmitter includes a keyboard and is adapted to transmit discrete radio signals in response to discrete keys being pushed.

5. The remote controlled multi-station irrigation system of claim 1, wherein the remote transmitter is adapted to transmit discrete radio signals in an FM dual tone multi-frequency (DTMF) format.

6. The remote controlled irrigation system of claim 5, wherein the receiver is adapted to decode received DTMF signals to a hexadecimal format for application to the controller.

7. The remote controlled multi-station irrigation system of claim 1, wherein the controller includes a local keyboard connected to supply irrigation program information to the processor, the processor being responsive to input signals from the input terminal means to provide actuation signals via the interface circuitry to the selected actuator circuit, and the controller having a local mode in which the station actuator circuits are actuated in response to program information stored in the processor, and including means for disabling the local mode and setting the controller to a remote mode, the processor being responsive in the remote mode only to input signals from the input terminal means.

8. The remote controlled irrigation system of claim 7, wherein the local mode disabling means is responsive to the input terminal means receiving a connecting means from the receiver.

9. The remote controlled irrigation system of claim 8, wherein the connecting means comprises a removable plug adapted to be inserted into the controller's input terminal means, the controller disabling the local mode in response to the plug being inserted.

10. The remote controlled irrigation system of claim 7, wherein the input terminal means has a common connection with the controller's local keyboard to the processor, enabling the processor to be programmed with input signals from the receiver in the remote mode in addition to remotely controlling the operation of individual selected actuator circuits.

11. The remote controlled multi-station irrigation system of claim 1, wherein the processor includes means for advancing the application of an actuating signal among the station actuator circuits, and the transmitter includes means to broadcast a discrete operational signal which causes the receiver to produce a corresponding processor input signal to activate the station actuator advancing means.

12. A controller for a remote controlled multi-station irrigation system, comprising:

a plurality of individual station actuator circuits, a central processor, a local keyboard connected to supply irrigation program information to the processor, an input terminal means adapted to receive a connector from a receiver for remote signals and connected to provide remote input signals from the connector to the processor, interface circuitry interfacing between the processor and the station actuator circuits, the processor being responsive in a remote mode to remotely broadcast station identity and operational signals from the input terminal means to provide an operational control signal via the interface circuitry only to the actuator circuit which corresponds to a received station identity signal, and in a local mode to program information stored in the processor, and interrupt means connected to the processor for disabling the processor's local mode and setting the processor to its remote mode.

13. The irrigation controller of claim 12, the interrupt means being responsive to the input terminal means receiving a connector from a receiver for remote signals.

14. The irrigation controller of claim 12, wherein the input terminal means has a common connection with the local keyboard to the processor, and enables the processor to be programmed with remote input signals in the remote mode, in addition to remote control over the operation of individual selected actuator circuits.

15. The irrigation controller of claim 12, wherein the processor includes means for advancing the application of an actuation signal among the station actuator circuits in response to the receipt of a corresponding remote operational signal.

16. A communication system for use with a remote controlled multi-station irrigation system, comprising:

a portable transmitter adapted to broadcast selectable discrete station identity and operational signals on a wireless carrier signal, the transmitter including a manually operated keyboard adapted to select desired station identity and operational signals for broadcast, and a receiver including an antenna adapted to receive signals broadcast from the transmitter, circuit means connected to the antenna for removing the carrier portion of a received signal to produce a coded input signal, a decoding means connected to the circuit means for decoding a coded input signal to a signal format which is compatible with a sprinkler controller, and output means connected to the decoding means for providing decoded station identity and operational signals to a sprinkler controller, whereby the sprinkler controller can be operated by the transmitter to perform a selected operation for any selected station from any remote location within the transmitter's broadcast range from the receiver.

17. The communications system of claim 16, wherein the transmitter is adapted to broadcast discrete station identity and operational signals in an FM dual tone multi-frequency (DTMF) format.

18. The communications system of claim 17, wherein the receiver is adapted to decode received DTMF signals to a hexadecimal format.

19. The communications system of claim 16, wherein the receiver further includes a controller which comprises a plurality of individual station actuator circuits connected to receive operational signals from the output means, means connecting said actuator circuits to the field wiring for respective irrigation stations, thereby bypassing any local controller in the irrigation system, and means for directing an operational signal to the actuator circuit for the particular station which corresponds to the station identity signal received from the transmitter.

20. The communications system of claim 16, wherein the transmitter includes a keyboard adapted to select desired command signals for broadcast, a tone generator responsive to the keyboard for generating transmission tone signals, transmission circuitry for transmitting a signal corresponding to the generated tone signal, a power supply connected to supply power to the tone generator, a switch connecting the power supply to the transmission circuitry, and circuit means responsive to the tone generator producing a transmission tone signal for closing the switch and for holding the switch open at other times, thereby conserving power by disconnecting the transmission circuitry from the power supply except when the tone generator is producing a signal for transmission.

* * * * *